Aug. 15, 1967   P. J. ORTIZ   3,335,880
TOW TRUCK BOOM AND FRAME CONSTRUCTION
Filed July 22, 1965   2 Sheets-Sheet 1
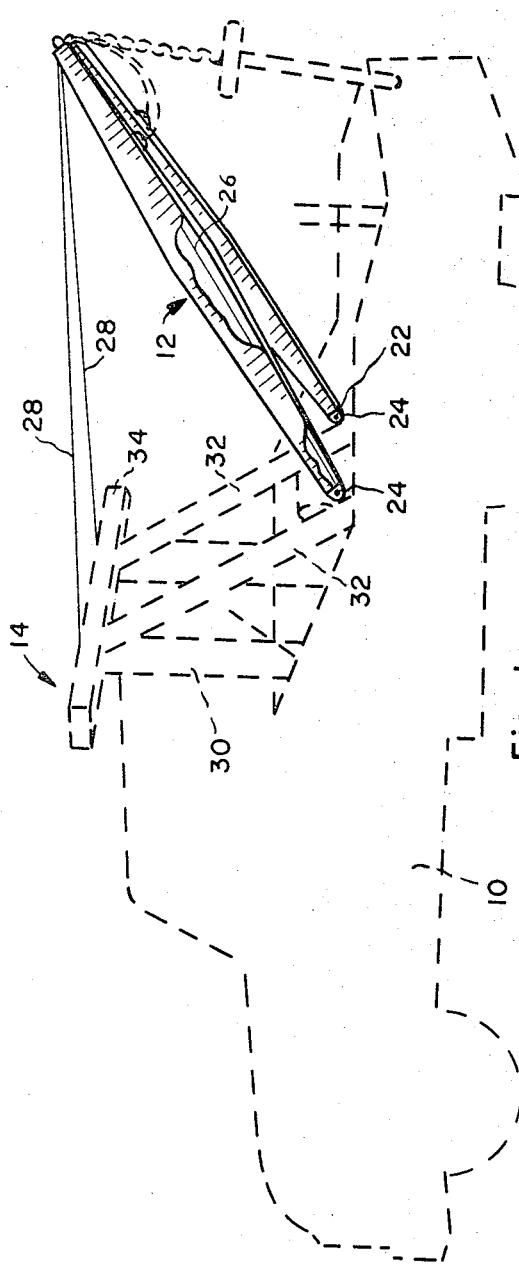
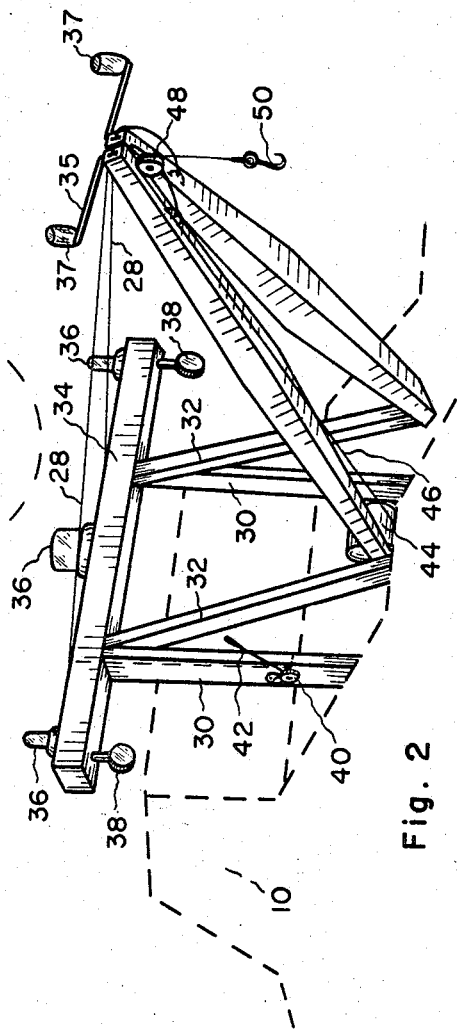
INVENTOR.
PHILIP J. ORTIZ
BY Alfred E. Miller
ATTORNEY Aug. 15, 1967  P. J. ORTIZ  3,335,880
TOW TRUCK BOOM AND FRAME CONSTRUCTION
Filed July 22, 1965  2 Sheets-Sheet 2

INVENTOR.
PHILIP J. ORTIZ
BY Alfred E. Miller
ATTORNEY

United States Patent Office 3,335,880
Patented Aug. 15, 1967

3,335,880
TOW TRUCK BOOM AND FRAME
CONSTRUCTION
Philip J. Ortiz, Railroad Ave., Hopewell
Junction, N.Y. 12533
Filed July 22, 1965, Ser. No. 473,928
3 Claims. (Cl. 214—86)

The present invention relates to a wrecker or tow truck, and more particularly to a boom and frame construction mounted thereon which is stronger, yet more easily handled than boom and frame constructions heretofore known.

An object of the present invention is to provide a boom construction for a tow truck that constitutes U-shaped channels welded together for completely enclosing a space and permitting the housing therein of electric wires free from exposure to the atmospheric elements. The aforesaid U-shaped channels, when welded together, form a structural unit that is considerably stronger than previously known boom arrangements. Moreover, the smooth side surfaces of the boom permit advertising lettering to be easily applied thereto.

Another object of the present invention is the provision of an individually suspended twin boom construction in which each boom separately controls a cable that may be used to lift a tow bar or other type of tow hitch arrangement.

A further object of the present invention is to provide a boom and frame arrangement for a tow truck wherein said frame permits easy visibility of the rear of the truck by the driver and also provides a cross bar for red and amber flashing emergency lights, as well as an advantageous mounting for spot lights that may be easily seen by drivers and pedestrians from all directions.

Another object of the present invention is to provide a tow truck boom that is constituted of four steel pieces of identical construction, preferably welded together, thereby resulting in a structure which is inexpensive to manufacture, yet is strong and durable, and reliably effective for the purposes intended.

The above and other features, objects and advantages of the present invention will be fully understood from the following description considered in connection with the accompanying illustrative drawings.

FIG. 1 is a perspective view of the tow truck boom constructed in accordance with the teachings of the present invention.

FIG. 2 is a perspective view of the tow truck boom of FIG. 1 together with details of the frame arrangement constructed in accordance with the teachings of the present invention.

Referring more particularly to the drawings, the present tow truck or wrecker 10 shown in dotted lines is provided with a novel boom and frame construction for assisting in lifting and lowering of vehicles. The boom is a twin boom arrangement in which each identical boom is referred to generally by the numeral 12, and the frame is referred to generally by the numeral 14.

Figure 3:
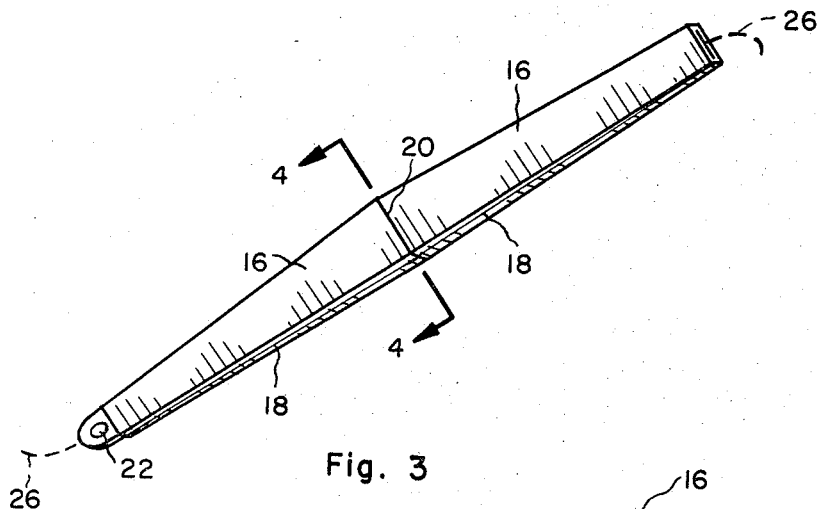
FIG. 3 is a perspective view of one of the twin boom members of the present invention shown detached from the tow truck.
Figure 6:
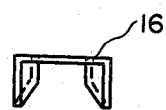
FIG. 5 is an elevation view of one of the channel elements which when welded to another channel element forms half of the boom construction and FIG. 6 is a front elevation of the channel element shown in FIG. 5.
Figure 5:
Figure 4:
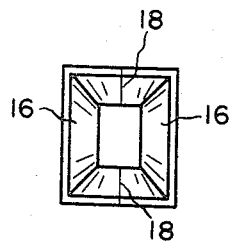
FIG. 4 is a view taken along the lines 4—4 of FIG. 3.

FIGS. 3–6 show the boom structure and the method of manufacture of this structure in detail. FIGS. 5 and 6 illustrate a U-shaped channel 16 which is both elongated and tapered. Oppositely disposed, and with the open parts facing each other, the free ends of the legs of the U-shaped channels 16 are welded together at 18 (FIG. 4) and the four U-shaped channels in pairs of two in end-to-end relationship are finally welded together at 20 (FIG. 3). The bottom end of the assembled boom structure is provided with an eye 22 through which a pin 24 attaches the boom to the frame 14. An electric wire 26 is entirely enclosed within the boom 12 and in that manner is not exposed to the atmospheric elements as well as to possible injury which may occur when the boom is raised or lowered.

Each of the booms 12 is individually suspended by means of separate cables 28, said cables being attached at one end to the free ends of the booms 12 and are passed through hollow standards 30. Angled struts 32 reinforce the frame while a cross piece 34 is provided at a prescribed height above the rear cab window of the tow truck and has mounted thereon a number of emergency blinker lights 36 of red or amber color as well as spot lights 38 suspended underneath the cross piece 34. A transverse bar 35 is affixed to the free end of boom 12 whereby a pair of stop lights 37 are mounted thereon.

The end of the cables 28 which pass through the hollow standards 30 are wound around a drum (not shown) in each of the standards. One end of each of the drums is provided with a ratchet ring 40 and a pivoting pawl lever 42. The ratchet ring 40 with its co-acting pawl lever 42 assures that each cable 28 is individually suspended and controlled. The individual booms 12 may be lowered and raised separately by means of the combination of the ratchet ring 40 and pawl lever 42.

A winch 44 is located between the standards 30 of the frame. The cable 46 of the winch 44 passes over pulley 48 suspended from the boom 12. The free end of cable 46 terminates in a hook 50 which is affixed to a tow bar, tow hitch or directly to the vehicle to be towed by the tow truck.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. In a tow truck a boom construction comprising four identical channel-shaped members each being narrowed at one end and widened at the other end and in which pairs of channel-shaped members facing each other are secured together and two pairs of channel-shaped members positioned in end-to-end relationship are joined at the adjacent widened ends and forming an elongated boom enclosing a space therebetween, and means for operatively connecting one end of said boom to said tow truck in a cantilever manner.

2. In a tow truck a boom and frame construction comprising a frame mounted on said truck having two substantially vertical, spaced, hollow standards, a crosspiece secured to one end of each of said standards, a cable for the boom passing through at least part of one of said hollow standards, means for adjusting the effective length of said cable, and a plurality of lights mounted on said crosspiece, four identical channel-shaped members in which pairs of channel-shaped members facing each other are secured together and the two pairs of channel-shaped members are positioned in end-to-end relationship and joined forming an elongated boom enclosing a space therebetween, and means for connecting one end of said boom to said frame in a cantilever manner.

3. In a tow truck a boom and frame construction as set form in claim 2 wherein said means for adjusting the effective length of said cable is a pawl and ratchet construction mounted on each of said standards.

References Cited

UNITED STATES PATENTS

| | | | |
|---|---|---|---|
| 1,359,379 | 11/1920 | Holmes. | |
| 1,740,053 | 12/1929 | Wehr | 52—731 |
| 2,190,258 | 2/1940 | Colorigh | 212—8 X |
| 2,353,655 | 7/1944 | Day | 212—8 X |
| 2,509,435 | 5/1950 | Huttinger. | |
| 2,928,557 | 3/1960 | Cline | 214—86 X |
| 3,063,523 | 11/1962 | Triplett | 52—731 X |

GERALD M. FORLENZA, *Primary Examiner.*

A. J. MAKAY, *Examiner.*